M. FORT.
Shovel Plow.
No. 100,743.  Patented March 15, 1870.
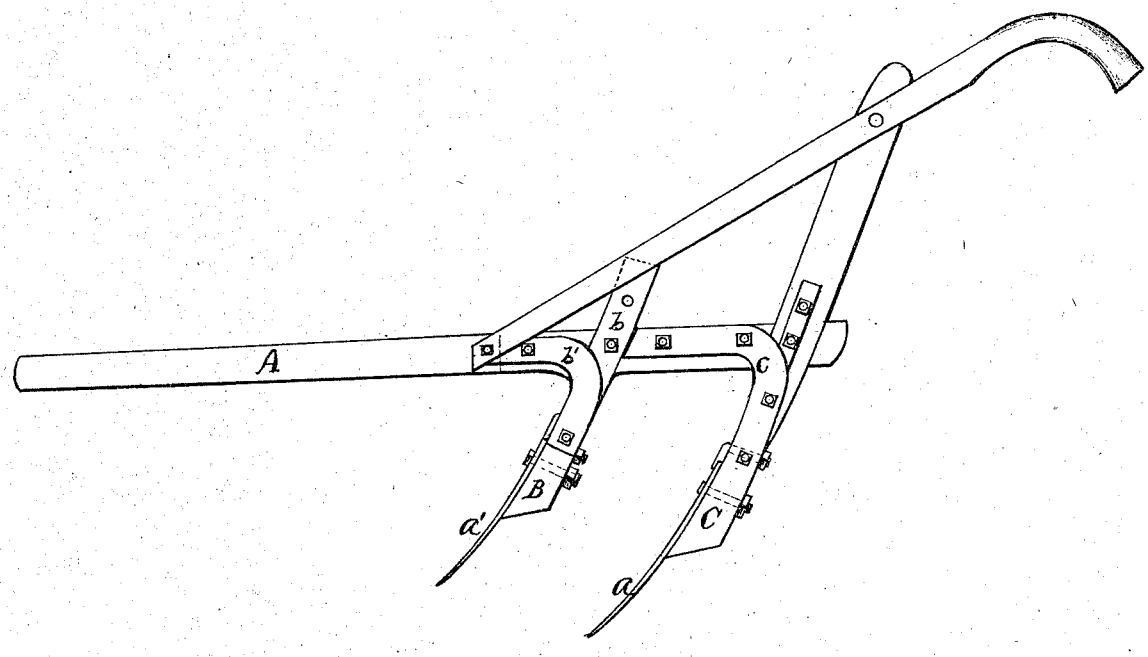
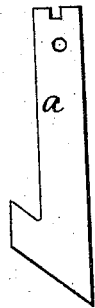
Witnesses
Solon C. Kemon
Chas. A. Pettit
Miranda Fort
Inventor
by Geo. E. Brown,
Atty.

UNITED STATES PATENT OFFICE.

MIRANDA FORT, OF TALBOTTON, GEORGIA.

IMPROVEMENT IN PLOWS.

Specification forming part of Letters Patent No. 100,743, dated March 15, 1870.

*To all whom it may concern:*

Be it known that I, MIRANDA FORT, of Talbotton, in the State of Georgia, have invented a new and useful Improvement in Plows; and I do hereby declare that the following is a full, clear, and exact description of the same, reference being had to the accompanying drawings and letters of reference marked thereon, making a part of this specification, in which—

Figure 1 is a side elevation, and Fig. 2 is a rear elevation.

This invention consists in the combination of two shovel-plows, one placed directly behind the other, the rear one arranged for cultivating and subsoiling and the forward one for turning soil and covering grain, the rear plow being fixed and the front one adjustable to different depths.

To enable those skilled in the art to make and use my invention, I now proceed to describe its construction and operation.

Similar letters in the drawings refer to like parts.

A is the plow-beam; B, the forward stock, and C the rear stock, each one bearing its share. The stocks are solid at their lower ends, and each has two branches projecting upward from the solid part and passing one to each side of the beam, and bolted thereto. The branches $b$ of the forward stock are straight, and set upon the beam in the requisite inclination. Their connection with the beam is strengthened by curved braces $b'$, bolted at their lower ends to the stock and at their upper ends to the beam. The forward stock is adjustable as to height, its position being variable by removing the bolt which fastens the branches $b$ to the beam, and also the bolt which fastens the curved braces $b'$ to the stock.

The rear stock is not adjustable, but fixed, its branches $c$ being curved and their upper parts projecting forward along the beam until their extremities abut upon the straight branches $b$ and help support the latter against the strain of its share.

In using this plow, after the land has been turned and subsoiled, both shares being on, the front stock and share may be removed, and the rear one will then serve as a cultivator. In this form the plow is excellent for running close to young corn, cotton, or other plants, and shaving grass away from them, while another plow follows and turns the soil upon the plants. Whether one or both shares are used, the plow will run through grass-land for any length of time without clogging, owing to the absence of supporting-rods. With both shares on, the land may be subsoiled by the rear plow, and grain covered by the front one in the same operation.

It will be seen that the construction of the stocks and their branches and the arrangement of the braces in connection with the beam are such as to insure great strength at small expense.

What I claim as new, and desire to secure by Letters Patent, is—

The stock B, provided with the branches $b$, and combined with the braces $b'$, stock C, provided with the branches $c$, the latter serving as braces to the branches $b$, and the beam A, all constructed and arranged as for the purpose described.

MIRANDA FORT.

Witnesses:
HUGH HALL,
CALHOUN MATHEWS.